(12) United States Patent  
Ramani et al.

(10) Patent No.: US 11,189,068 B2  
(45) Date of Patent: Nov. 30, 2021

(54) MACRO-BASED ELECTRONIC MAP EDITING

(71) Applicant: Square Enix Ltd., London (GB)

(72) Inventors: Sahil Ramani, Redwood City, CA (US); Patrick Wouterse, Utrecht (NL); Matt Bard, Redwood City, CA (US); Kenneth Tan, Redwood City, CA (US); Jose Aponte, Redwood City, CA (US)

(73) Assignee: Square Enix Ltd., London (GB)

( * ) Notice: Subject to any disclaimer, the term of this patent is extended or adjusted under 35 U.S.C. 154(b) by 0 days.

(21) Appl. No.: 16/714,457

(22) Filed: Dec. 13, 2019

(65) Prior Publication Data

US 2021/0183122 A1 Jun. 17, 2021

(51) Int. Cl.
| | |
|---|---|
| *G06T 11/60* | (2006.01) |
| *G06F 16/29* | (2019.01) |
| *G06T 3/00* | (2006.01) |
| *G06T 11/00* | (2006.01) |
| *A63F 13/63* | (2014.01) |

(52) U.S. Cl.
CPC .............. *G06T 11/60* (2013.01); *G06F 16/29* (2019.01); *G06T 3/00* (2013.01); *G06T 11/001* (2013.01); *A63F 13/63* (2014.09); *A63F 2300/6018* (2013.01)

(58) Field of Classification Search
CPC ......... G06T 11/60; G06T 3/00; G06T 11/001; G06F 16/29; A63F 2300/6018; A63F 13/63

See application file for complete search history.

(56) References Cited

U.S. PATENT DOCUMENTS

| | | | | |
|---|---|---|---|---|
| 8,207,966 | B2* | 6/2012 | Sommers | G06T 15/00 345/423 |
| 8,799,788 | B2* | 8/2014 | Hickman | G06T 19/00 715/757 |
| 2006/0020431 | A1* | 1/2006 | Gipps | G06Q 10/06316 703/1 |
| 2013/0155058 | A1* | 6/2013 | Golparvar-Fard | G06T 17/00 345/419 |
| 2014/0340416 | A1* | 11/2014 | Teitlebaum | G06T 3/4092 345/589 |
| 2015/0348284 | A1* | 12/2015 | Bradbury | G06T 15/04 345/419 |

(Continued)

FOREIGN PATENT DOCUMENTS

| | | |
|---|---|---|
| JP | 2008-500636 A | 1/2008 |
| JP | 2012-252695 A | 12/2012 |

*Primary Examiner* — Michael Le  
(74) *Attorney, Agent, or Firm* — Fenwick & West LLP

(57) ABSTRACT

Embodiments relate to macro-based customization of electronic maps. A computing device stores a macro representing a map feature. The macro includes a set of textures, and the set of textures includes a height map. The computing device places an instance of the macro in an electronic map. The instance of the macro is visually represented in the electronic map based on a set of textures of the instance of the macro that corresponds to the set of textures of the macro. The computing device edits a texture in the set of textures of the instance of the macro. The computing device updates the visual representation of the instance of the macro based on the edit to the texture.

20 Claims, 7 Drawing Sheets

(56) References Cited

U.S. PATENT DOCUMENTS

2015/0348285 A1\* 12/2015 Wang ..................... G06T 15/04
                                                        345/582
2017/0340971 A1\* 11/2017 Schwaiger ............. A63F 13/63

\* cited by examiner

MACRO-BASED ELECTRONIC MAP EDITING

BACKGROUND

The present disclosure relates to editing electronic terrain representations, and more specifically, to assembling electronic maps using macros.

Many video games include a game board, map, or so on (in general, a "terrain") upon which the video game takes place. For example, the video game may include a board upon which various game pieces are placed and moved during the course of the video game. Video games often include a large amount of software and data that takes significant time and computing resources to upload, transmit, download, or otherwise use. The terrain is often one of the largest segments of this software and data. As such, uploading, transmitting, downloading, or otherwise using the terrain typically uses significant time and computing resources. Furthermore, terrains are typically immutable and often repetitive, which can cause players of video games that include the terrains to lose interest in the video games.

SUMMARY

Embodiments relate to macro-based customization of electronic maps. A computing device stores a macro representing a map feature. The macro includes a set of textures, and the set of textures includes a height map. The computing device places an instance of the macro in an electronic map. The instance of the macro is visually represented in the electronic map based on a set of textures of the instance of the macro that corresponds to the set of textures of the macro. The computing device edits a texture in the set of textures of the instance of the macro. The computing device updates the visual representation of the instance of the macro based on the edit to the texture.

In one or more embodiments, the computing device transforms the instance of the macro, where the transform includes at least one of rescaling, translating, and rotating the instance of the macro.

In one or more embodiments, the electronic map further comprises a set of rules defining interactions among instances of macros. The computing device determines that the instance of the macro and an instance of a second macro overlap, and blends the instance of the macro and the instance of the second macro based on the set of rules.

In one or more embodiments, blending the instance of the macro and the instance of the second macro is further based on a set of blending parameters.

In one or more embodiments, the computing device compresses the electronic map by collapsing the instance of the macro into a base layer of the electronic map and sends the compressed electronic map to another computing device.

In one or more embodiments, updating the visual representation of the instance of the macro based on the edit to the texture includes resampling a plurality of textures in the set of textures.

In one or more embodiments, the computing device places another instance of the macro in the electronic map.

The figures depict various embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digit or digits of each reference number correspond to the figure in which the reference number is first used.

Embodiments relate to macro-based customization of electronic maps. A computing device stores a macro representing a map feature. The macro includes a set of textures, and the set of textures includes a height map. The computing device places an instance of the macro in an electronic map. The instance of the macro is visually represented in the electronic map based on a set of textures of the instance of the macro that corresponds to the set of textures of the macro. The computing device edits a texture in the set of textures of the instance of the macro. The computing device updates the visual representation of the instance of the macro based on the edit to the texture.

Among other advantages, embodiments enable efficient transfer of custom electronic maps, e.g., compression of macro-based electronic maps for transfer among content creators, servers, and client devices. Furthermore, embodiments enable flexible electronic map design and implementation, enabling greater customization and variety throughout the electronic map. As such, both computing device performance and user experience may be improved. Macro-based customization of electronic maps also leads to a more organic and immersive electronic map, further improving user experience.

Figure 1:
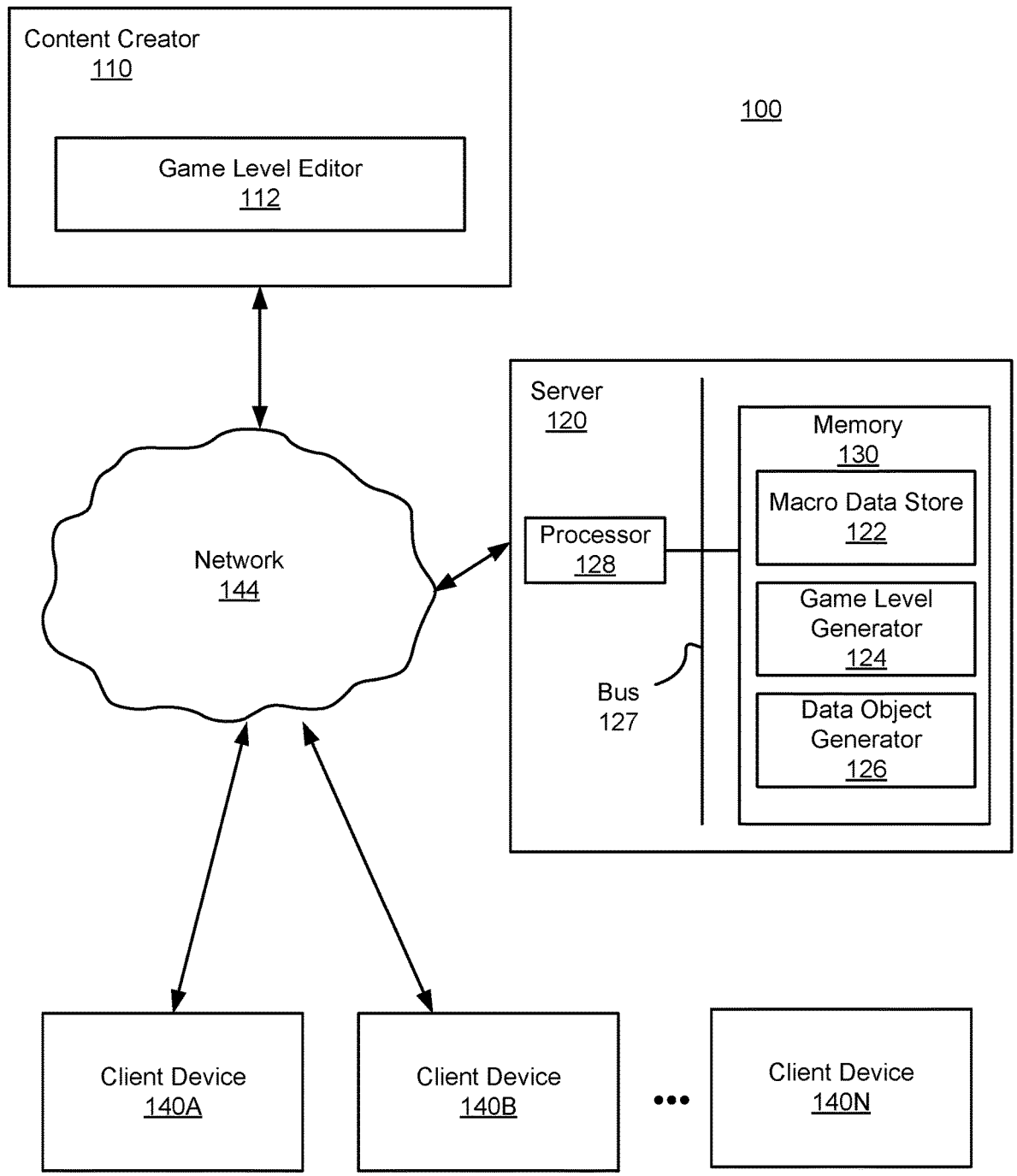
FIG. 1 is a block diagram of a system, according to an embodiment.

FIG. 1 is a block diagram of a system 100 in which the techniques described herein may be practiced, according to an embodiment. The system 100 includes a content creator 110, a server 120, client devices 140, and a network 144. In other embodiments the system 100 may include additional content creators 110 or servers 120, or may include a singular client device 140.

The content creator 110, the server 120, and the client devices 140 are configured to communicate via the network 144. The network 144 includes any combination of local area and/or wide area networks, using both wired and/or wireless communication systems. In one embodiment, the network 144 uses standard communications technologies and/or protocols. For example, the network 144 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 144 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 144 may be represented using any suitable format, such as hypertext markup language (HTML) or extensible markup language (XML). In some embodiments, all or some of the communication links of the network 144 may be encrypted using any suitable technique or techniques.

The content creator 110 is a computing device, such as a gaming system, a personal computer, a mobile phone, a tablet, or so on, which includes and can execute a game level editor 112. The game level editor 112 is a software application for designing electronic maps, e.g., for one or more games. Electronic maps include a base layer of tiles, such as square tiles, that divide the electronic map into a particular arrangement of segments which may individually be edited. The tiles, when positioned in the particular arrangement, form a particular three-dimensional ("3D") topology. Tiles, electronic maps, and macros are described in greater detail below. In some embodiments, the game level editor 112 additionally includes some or all of the components of the server 120.

A user of the content creator 110 uses the game level editor 112 to create electronic maps, such as a level of a video game. For example, the user may use the game level editor 112 to piece together a variety of tiles into a desired arrangement to form a custom electronic map. The user may use the game level editor 112 to add instances of macros to the electronic map, piecing together the instances of macros into a desired arrangement. The user may use the game level editor 112 to edit macros, which will propagate those edits to instances of the macro, or individual instances of macros, altering their particular position, size, and composition.

A macro is a representation of a major feature of an electronic map, such as mountains, hills, valleys, and cities. Macros include sets of textures, including a height map. The height map is a texture defining the elevations of various portions of the macro. For example, the height map for a mountain may include high elevation values for locations towards a middle of the macro and lower elevation values for locations towards edges of the macro. Other textures that can be included in the set of textures include alpha maps, material surfaces, biomes, shared layers, detail layers. Depending upon the embodiment, a macro includes one or more other textures in addition to the height map.

An alpha map is a texture that cuts out portions of the height map. For example, if the user of the content creator 110 were to add a cave to a mountain macro, the alpha map would be used to specify a portion of the macro at which to mask the height map.

A material surfaces texture specifies the materials used in surfaces of artificial objects placed within the confines of the macro. For example, wood, stone, or metal. A forest macro may use a 'wood' material surfaces texture, whereas a modern city macro may use a 'metal' material surfaces texture.

A biome texture specifies the type of foliage represented within the macro. For example, the biome texture may specify forest, grassland, desert, arctic, swamp, or so on. Particular instances of foliage included in the macro, e.g., instances of trees or sand dunes or glaciers, may be determined based on a biome graph. The biome graph is an asset separate from the biome texture that specifies assets (e.g., game objects such as trees or sand dunes) to spawn across the macro according to a set of biome rules. The game level editor 112 assigns the biome texture to a particular biome graph, and the game system uses the biome graph to populate the macro with game objects, such as trees for a forest biome or patches of grass for a grassland biome, according to the biome graph rules as they apply to the macro.

A detail layer texture is a masking layer upon a biome texture or a material surfaces texture. The detail layer texture masks a region of the biome texture or material surfaces texture. For example, a mountain macro with a jungle biome texture may additionally include a detail layer texture specifying that only one side of the mountain includes jungle.

A shared layer texture modifies a biome texture such that particular types of foliage are applied. For example, a mountain macro with a jungle biome may include a shared layer texture specifying where trees will and will not be located within the macro.

Macros may include additional or alternative textures than those described herein. A user of the content creator 110 may use the content creator 110 to place instances of macros into an electronic map. For example, the content creator 110 may place two instances of a mountain macro into the same electronic map at different locations. The content creator 110 can edit each of the individual instances of the mountain macro separately, or can edit the mountain macro itself. If the content creator 110 edits an individual instance of the mountain macro, such as adding an alpha map to create a cave, that change reflects only upon that instance of the macro. However, if the content creator 110 edits the macro itself rather than an instance of the macro, the edit is propagated to each instance of the macro in the map, unless alternatively customized. For example, if the content creator 110 edits the macro itself to add an alpha map, the alpha map is propagated to each instance of the macro in the electronic map. However, if an instance of the macro has already been individually edited to add an alpha map, it is not overwritten. In some embodiments, however, edits to the macro itself override previous edits to particular instances of the macro. Whether edits to a macro override extant edits to instances of the macro may depend upon a configuration of the content creator 110.

The content creator 110 can translate, rotate, and resize instances of macros. For example, an instance of a mountain macro may be scaled to increase or decrease its size, e.g., in terms of a percentage of a tile occupied by the mountain macro. The instance of the mountain macro may be moved about the tile. Tiles include coordinate systems, such as local coordinate systems local to the tile or global coordinate systems corresponding to the entire electronic map. The instance of the mountain macro may be moved by the content creator 110 from a first set of coordinates within the tile to a second set of coordinates within the tile. The instance of the mountain macro may also be rotated.

In some embodiments, instances of macros may themselves be copied, with copies placed within the electronic map. For example, an instance of a mountain macro may be edited to add a texture. The edited instance of the mountain macro may be copied, and the copy may be placed elsewhere in the electronic map by the content creator 110.

When two instances of macros are placed such that they overlap, the content creator 110 automatically blends the instances to form a cohesive whole. The blending operation may be according to one or more rules codified into the electronic map by the user of the content creator 110, and may additionally be according to one or more blending parameters. The rules codified into the electronic map can include a macro priority to specify which macros take priority over which, e.g., which of two instances of different macros is masked by the other at an overlapping portion. For example, all macros may have higher priority than the base layer of a tile, which is masked at a location upon placement of a macro at that location.

The rules for textures are preset, and depending upon the embodiment, a subset of the parameters of the rules are exposed for customization by the game level editor 112. For example, macro priority is exposed to the game level editor 112 for customization such that a user of the game level editor 112 may set a macro priority. The blending parameters may include an edge fade radius parameter, specifying a radius of pixels used for a Gaussian blur between overlapping macros; a height clip parameter, which clamps height values of macros within a specified range; and a pixel border parameter, where macro values outside the pixel border are ignored for blending.

The server 120 is a computing device that includes a processor 128 and a memory 130 connected by a bus 127. The memory 130 includes a macro data store 122, a game level generator 124, and a data object generator 126. The server 120 may receive and route messages between the content creator 110 and the client devices 140. Additionally, the server 120 may store in memory 130 one or more electronic maps, such as an electronic map received by the server 120 from a content creator 110, and send one or more electronic maps to the client devices 140.

The processor 128 is capable of executing instructions, sequential or otherwise, that specify actions to be taken, such as performance of some or all of the techniques described herein. The bus 127 connects the processor 128 to the memory 130, enabling data transfer from the one to the other and vice versa. Depending upon the embodiment, the server 120 may include additional elements conventional to computing devices, as known to a person having ordinary skill in the art.

The macro data store 122 stores macros and electronic maps. For example, the macro data store 122 may store a definition of each macro, such as its textures. The macro data store 122 also stores electronic maps received from content creators 110 or created by a creator of the game or administrator of the server 120. The macro data store 122 may also store metadata associated with a macro or electronic map, such as rules created for the electronic map pertaining to macros, an identifier of the creator of the electronic map, a size of the electronic map (as measured, for example, in megabytes ("MB")), or so on. The macro data store 122 may also store information such as game objectives, objects, or so on that relate to the electronic map but are not necessarily part of the electronic map.

The game level generator 124 generates game levels based on electronic maps. For example, the game level generator 124 generates a game level using an electronic map received from the content creator 110. The game level may add game data such as objectives and game characters to the electronic map. The game data may be randomly generated, or received as input from an outside source, such as the game creator or the administrator of the server 120.

The data object generator 126 generates data objects for transmitting electronic maps. Electronic maps often include a large amount of data, large enough that uploading, transmitting, and downloading the data involves significant latency. Techniques described herein, including those pertaining to the data object generator 126, address this latency by lessening the amount of data involved in transmitting an electronic map.

The data object generator 126 may compress an electronic map including instances of macros by collapsing the instances of the macros into a single macro layer of the electronic map. That is, rather than keep each instance of a macro as separate data, the various macros are unified into a single macro layer to reflect the various textures of each macro at the positions of the electronic map covered by those textures, in accordance with any rules instituted for the electronic map. The data object generator 126 may send these compressed electronic maps to client devices 140. The client devices 140 receive the data object and reconstruct the electronic map represented by the data object. In some embodiments, the data object generator 126 is also or alternatively present at the content creator 110, which may use the data object generator 126 to compress electronic maps for transmittal to the server 120.

Each client device 140 is a computing device that includes a game or other software that uses an electronic map. The client device 140 receives data objects from the server 120 and uses the data objects to construct electronic maps for use, for example, in the game. Different client devices 140 can request different data objects from the server 120. For example, client device 140A can request a first electronic map from the server, client device 140B can request a second electronic map from the server 120, and so on; client device 140N can request an $N^{th}$ electronic map from the server 120.

The server 120 may send a data object to a client device 140 that corresponds to the electronic map requested by the client device 140. For example, client device 140A may receive a first data object corresponding to the requested first electronic map, and so on.

Figure 2:
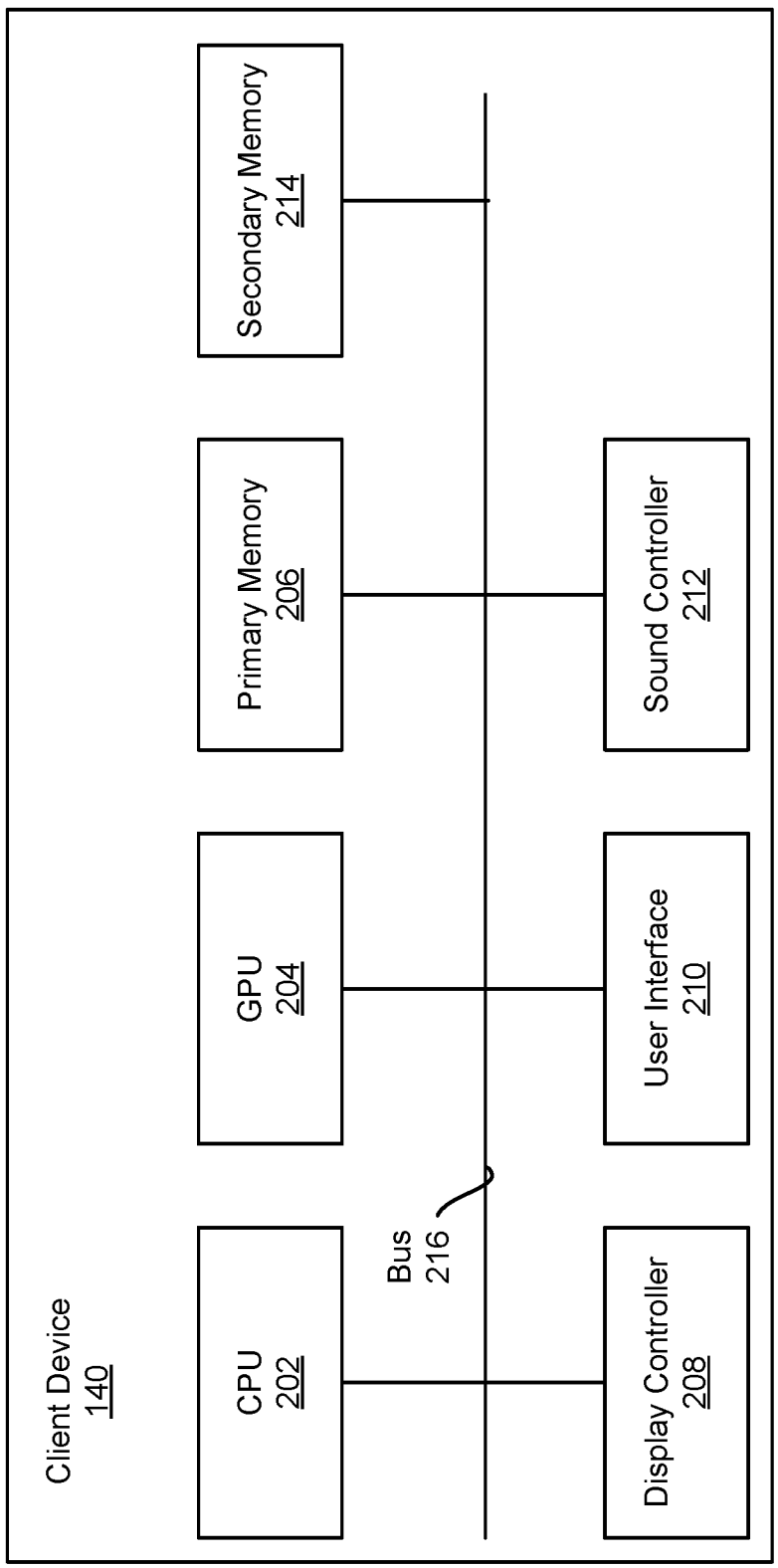
FIG. 2 is a block diagram of the client device of FIG. 1, according to an embodiment.

FIG. 2 is a block diagram of the client device 140 of FIG. 1, according to an embodiment. Depending upon the embodiment, the content creator 110 and/or server 120 may comprise a computing device that includes some or all of the hardware and/or software elements of the client device 140 described herein. The client device 140, content creator 110, and/or server 120 are any machine capable of executing instructions, and may each be a standalone device or a connected (e.g. networked) set of devices. For example, in one embodiment, the content creator 110 is a client device 140.

The client device 140 includes a central processing unit ("CPU") 202, a graphics processing unit ("GPU") 204, a primary memory 206, a secondary memory 214, a display controller 208, a user interface 210, and a sound controller 212 that are connected by a bus 216. While only a single client device 140 is illustrated, other embodiments may include any collection of client devices 140 that individually or jointly execute instructions to perform any one or more of the methodologies discussed herein.

The primary memory 206 is a machine-readable medium that stores instructions (e.g., software) embodying any one or more of the methodologies or functions described herein. For example, the primary memory 206 may store instructions that, when executed by the CPU 202, configure the CPU 202 to perform a process 700, described below in detail with reference to FIG. 7. Instructions may also reside, partially or completely, within the CPU 202 and/or GPU 204, e.g., within cache memory, during execution of the instructions.

The term "machine-readable medium" should be taken to include a single medium or multiple media (e.g., a centralized or distributed database, or associated caches and servers) able to store instructions. The term "machine-readable medium" shall also be taken to include any medium that is capable of storing instructions for execution by the device and that cause the device to perform any one or more of the methodologies disclosed herein. The term "machine-readable medium" includes, but is not limited to, data repositories in the form of solid-state memories, optical media, and magnetic media.

The secondary memory 214 is a memory separate from the primary memory 206. Similar to the primary memory 206, the secondary memory 214 is a machine-readable medium that stores instructions (e.g., software) embodying any one or more of the methodologies or functions described herein. For example, the primary memory 206 may be a hard drive of the client device 140, and the secondary memory 214 may be a game disc for the game that uses the electronic map. As a specific example, the primary memory 206 may store a game system 300 that uses electronic map data stored on the secondary memory 214. Primary memory 206 and secondary memory 214 are described in greater detail with reference to FIG. 3 below.

The CPU 202 is processing circuitry configured to carry out the instructions stored in the primary memory 206 and/or secondary memory 214. The CPU 202 may be a general-purpose or embedded processor using any of a variety of instruction set architectures (ISAs). Although a single CPU is illustrated in FIG. 2, the client device 140 may include multiple CPUs 202. In multiprocessor systems, each of the CPUs 202 may commonly, but not necessarily, implement the same ISA.

The GPU 204 is a processing circuit specifically designed for efficient processing of graphical images. The GPU 204 may render objects to be displayed into a frame buffer (e.g., one that includes pixel data for an entire frame) based on instructions from the CPU 202. The GPU 204 may include one or more graphics processors that may execute graphics software to perform a part or all of the graphics operations.

The display controller 208 is a circuit that generates a video signal using graphical data from the GPU 204. For example, the display controller 208 drives a display device (e.g., a liquid crystal display (LCD) and a projector). As such, a game, including electronic maps, can be displayed as images or a video sequence through the display controller 208.

The sound controller 212 is a circuit that provides input and output of audio signals to and from the client device 140. For purposes of a terrain, the sound controller 212 can provide audio signals that align with actions and objects in the electronic map, e.g. at particular tiles, or parts of tiles.

The user interface 210 is hardware, software, firmware, or a combination thereof that enables a user to interact with the client device 140. The user interface 210 can include an alphanumeric input device (e.g., a keyboard) and a cursor control device (e.g., a mouse, a trackball, a joystick, a motion sensor, or other pointing instrument). For example, a user uses a keyboard and mouse to control a character's action within a game environment that includes an electronic map rendered by the client device 140. The game environment includes a simulation and rendering of the electronic map, within which the user's game character operates.

The client device 140 executes computer program modules for providing functionality described herein. As used herein, the term "module" refers to computer program instructions and/or other logic used to provide the specified functionality. Thus, a module can be implemented in hardware, firmware, and/or software. In some embodiments, program modules formed of executable computer program instructions are loaded into the memory 206, and executed by the CPU 202 or the GPU 204. For example, program instructions for the process 700 describe herein can be loaded into the primary memory 206 and/or secondary memory 214, and executed by the CPU 202 and GPU 204.

Figure 3:
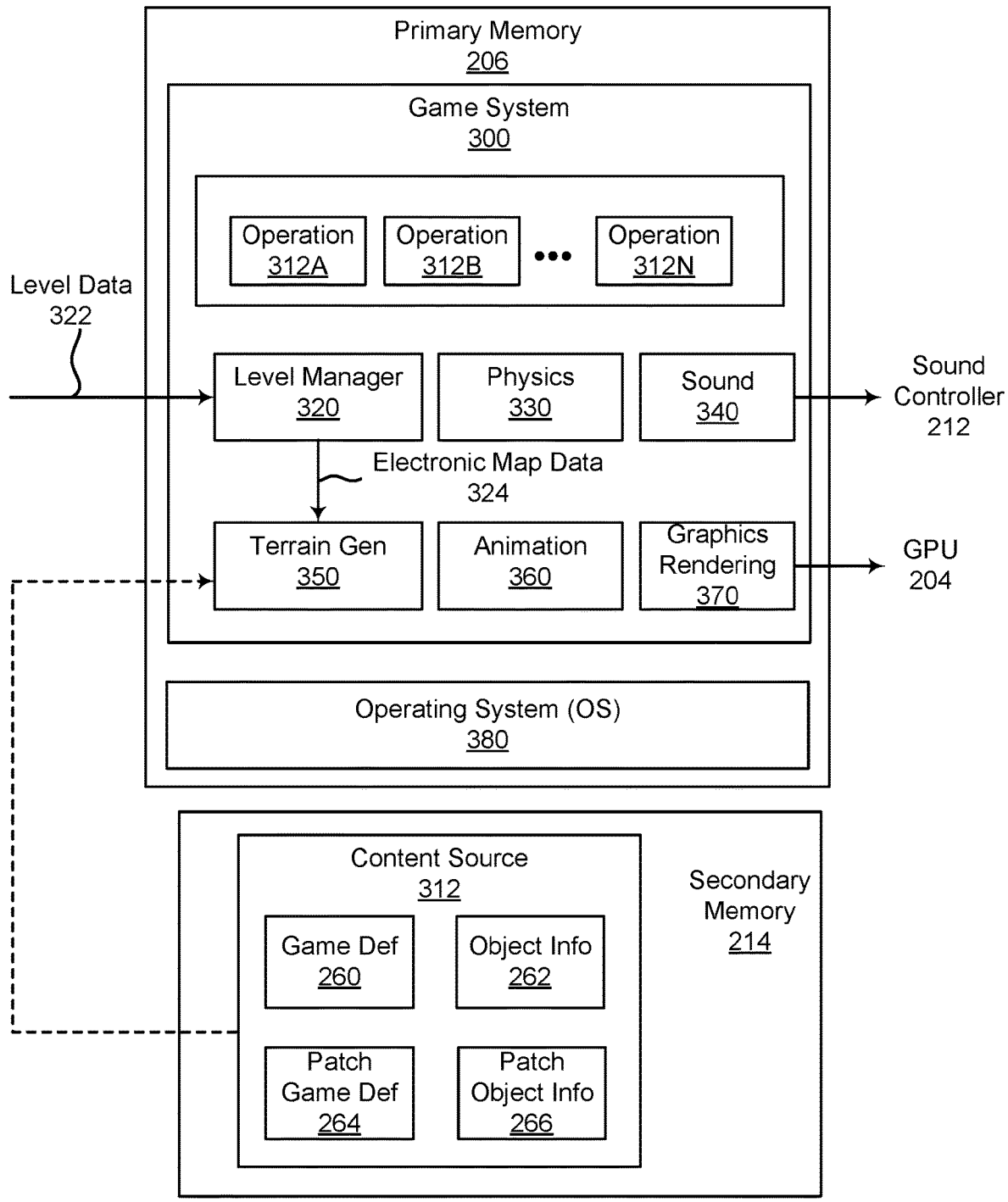
FIG. 3 is a block diagram of software modules in a memory of the client device of FIG. 1, according to an embodiment.

FIG. 3 is a block diagram of software modules in a memory of the client device 140 of FIG. 1, according to an embodiment. In particular, FIG. 3 illustrates software modules in the primary memory 206 and the secondary memory 214 of the client device 140. The primary memory 206 may store, among other modules, a game system 300 and an operating system ("OS") 380. The secondary memory 214 may store, among other modules, a content source 312. The primary memory 206 and secondary memory 214 may include other modules not illustrated in FIG. 3. Furthermore, in other embodiments, the primary memory 206 and secondary memory 214 may each store software modules and data represented herein as stored in the other.

The game system 300 includes a level manager 320, a physics system 330, a sound module 340, a terrain generator 350, an animation module 360, and a graphics rendering module 370. These modules collectively form a "game engine" of the game system 300.

The game system 300 performs operations 312A through 312N (collectively referred to as "operations 312") to generate the game environment, including the terrain. Specifically, the game system 300 performs these operations 312 to construct the electronic map, instantiate various objects upon the electronic map (e.g., the user's game character), and simulate interactions between the objects. The operations 312 refer to computing operations that result in changes in various parameters (e.g., states of objects and user status) based upon certain events (e.g., user interactions, expirations of time, and triggers occurring in the game).

Some operations 312 are associated with one or more objects, tiles, or positions within tiles in the game environment, and/or one or more actions associated with the objects, tiles, or positions within tiles. Examples of operations include a catapult launching a rock, a character running, fluid flowing, an arrow flying, a door opening, and so on. While some operations 312 have relatively simple responses (e.g., door opening), other operations may need to be simulated by the physics system 330 (e.g., movement of connected bodies). When executing the operations 312, the game system 300 may communicate with the components of the game engine (e.g., physics system 330) through application programming interfaces (APIs). At least one of these operations 312 involves constructing the electronic map.

The level manager 320 receives data objects, i.e., level data 322, from the server 120 and stores the level data 322 in the primary memory 206. Other modules of the game system 300 can request one or more levels from the level manager 320, which responds to the requests by sending the level data 322 corresponding to the requested level to the module of the game system 300 that sent the request. Alternatively, the level manager 320 may construct an electronic map from the level data 322, e.g., the level data 322 may include electronic map data created by a content creator 110.

The terrain generator 350 generates a complete electronic map based on electronic map data 324 and game data. The terrain generator 350 receives electronic map data 324 from the level manager 320 and game and object data from the content source 312 in the secondary memory 214, as described in greater detail below. In one embodiment, the terrain generator 350 uses game and object data to fill in an electronic map. For example, for each location within the electronic map, the terrain generator 350 retrieves game and object data to place within the electronic map.

The physics system 330 models and simulates the dynamics of objects in the game environment. After an operation 312 is initiated in the game system 300, the physics system 330 models how the action affects the object associated with the operation 312. For example, the physics system models a rock as it rolls down a hill. Depending on the action and object, other objects and actions may become associated with the action or object. For example, a thrown rock may knock over another object. This may trigger a new operation 312 where the object is hit by the rock. The physics system 330 uses electronic map information, e.g. data pertaining to an electronic map generated by the terrain generator 350, when modeling and simulating the dynamics of the objects in the game environment. For example, returning to the rolling rock example, the physics system 330 may determine that the rock must roll down the hill by identifying that the rock is positioned within the electronic map such that it is on a slope of the hill.

The animation system 360 is a module that performs kinematic animation of objects or the game environment based on the operations 312 from the game system 300. For example, if an operation 312 specifies that a robotic arm is moving, the animation system animates the kinematics of the arm movement. The animation system 360 may include any number of specialized modules which perform specific animation tasks. The animation system 360 may use information pertaining to an electronic map generated by the terrain generator 350 as a factor in the performance of kinematic animation of objects or the game environment.

The sound module 340 generates sounds corresponding to actions occurring in the game environment or to tiles or portions of tiles. For example, a portion of a tiles including a "river" object may correspond to a "flowing water" sound. Animation data from the animation system 360 or terrain information from the terrain generator 350 may be sent to the sound module 340 to enable the sound module 340 to produce sound. The sound module 340 sends sound data to the sound controller 212.

The graphics rendering module 370 renders graphics from the animation system 360 and terrain generator 350 to generate an image of the game environment. For example, the graphics rendering module 370 receives a scene file from the animation system 360 and a generated terrain from the terrain generator 350. The graphics rendering module 370 sends graphical data to the GPU 204 to render images on a display, e.g. a display of the client device 140 or a display connected to the client device 140, via the display controller 208.

The OS 380 manages computer hardware and software resources. Specifically, the OS 380 acts as an intermediary between programs and the computer hardware. For example, the OS 380 can perform basic tasks, such as recognizing input from the user interface 210 and sending output to the display controller 208.

The content source 312 includes various game data and object data, including a game definition module 260, an object information module 262, a patch game definition module 264, and a patch object information module 266. The content source 312 sends game data to the terrain generator 350 upon receiving a request for the game data from the terrain generator 350. For example, upon receiving a request for game data for a particular tile, the content source 312 sends the game data (and/or object data) corresponding to the particular tile (and any object data associated with the tile) to the terrain generator.

The game definition module 260 includes game definition data for use in generating a game level from an electronic map. For example, the game definition data may include objectives, rewards, and other game parameters.

The object information module 262 stores object information. Object information is data pertaining to objects within the game environment, such as the user's game character, non-player characters ("NPC's"), and other interactive game elements (e.g. weapons, tools, clothes, rocks, doors, etc.). Objects can be associated with tiles or positions within tiles. For example, a user of the game level editor 112 may add a tool to a position within a tile or instance of a macro when designing an electronic map. This information is included in the data object when the server 120 sends the electronic map to the client device 140. For example, each object may be associated with an object identifier, and the data object may include the object identifiers of each object included in the electronic map such that the terrain generator 350 can reconstruct the electronic map from the data object and data from the content source 312.

Patches are updates or additions to software modules or data that are typically applied to the software modules or data after it is loaded into a memory. For example, a patch may be applied to a software module several weeks after the release and downloading of the software module by client devices 140 in order to address one or more bugs in the software module, or to add new content to the software module. As a specific example, a patch to the content source 312 may add new game data or object data, such as a new objective, or a new object, such as a hat.

The patch game definition module 264 and the patch object information module 266 incorporate patch information that involves game data and object data, respectively. For example, the client device 140 may download a patch over the network 144, such as a patch provided by the server 120 or the content creator 110. The client device 140 may then send the patch to the content source 312. The patch game definition module 264 incorporates game data included in the patch, such as a new objective, into the game definition module 260, and the patch object information module 266 incorporates object data included into the patch, such as a new object, into the object information module 262.

Figure 4A:
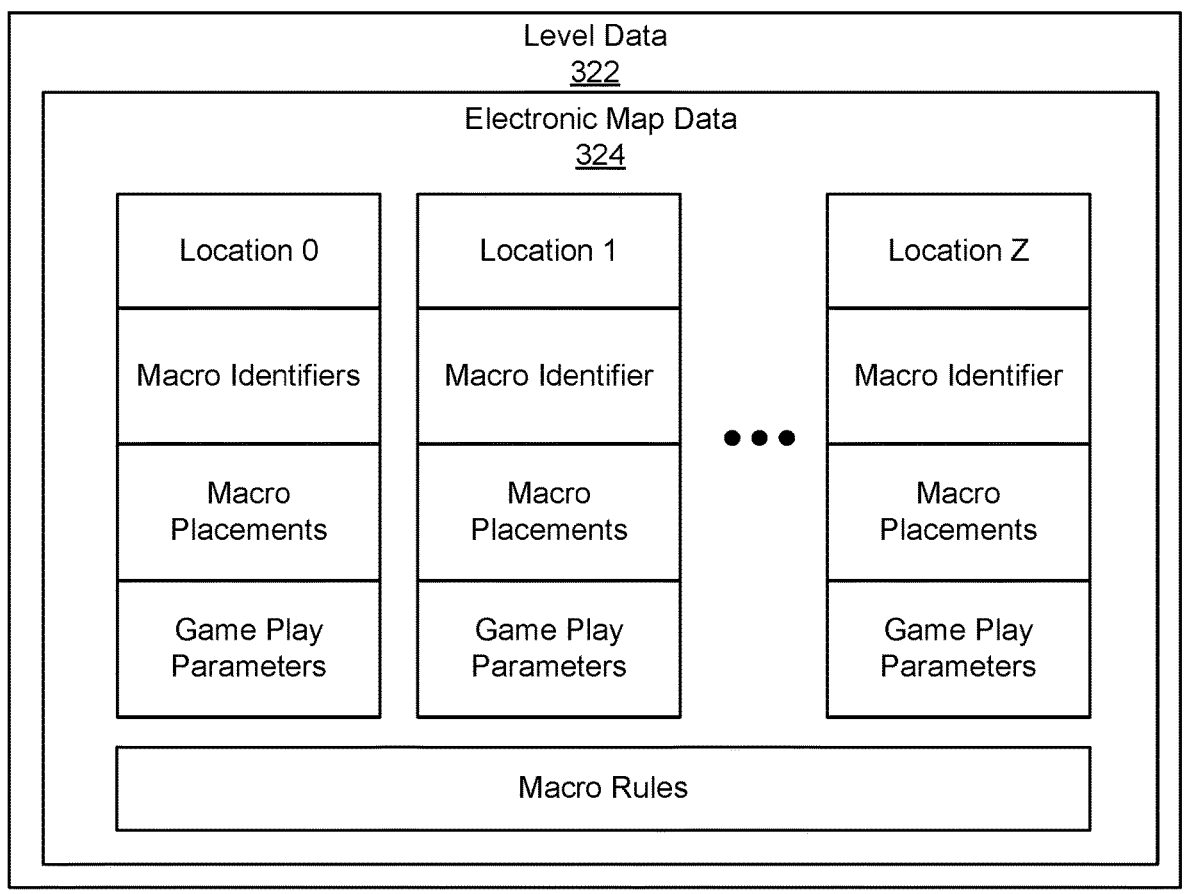
FIG. 4A is a block diagram of level data used by software modules in memory of the client device of FIG. 1, according to an embodiment.

FIG. 4A is a block diagram of level data used by software modules in memory of the client device of FIG. 1, according to an embodiment. The level data 322 represents a level including an electronic map and includes electronic map data 324 describing the electronic map, such as macro identifiers and macro placements. The level data 322 may also include other information, such as game play parameters. In an embodiment, the level data 322 is the data object sent by the server 120 to the client device 140. The level data 322 includes a graph or other data structure describing the electronic map such that the electronic map data 324 represents the overall underlying structure of the electronic map, including each instance of each macro.

The electronic map data 324 may be divided by location, such as each tile. Each location within the electronic map data 324 is associated with macro identifiers, macro placements, and game play parameters. The macro identifiers associated with the location indicate the macros included in the electronic map. The macro placements indicate the positions of instances of macros within the location. The set of game play parameters may include, depending upon the embodiment, various objects, characters, and other game aspects associated with the location. The set of gameplay parameters may further include information specifying where each object and character should be placed within the tile. In other embodiments the set of game play parameters may include additional or different data, such as data pertaining to one or more game play objectives.

The electronic map data 324 additionally includes the macro rules, such as the priority order of the macros.

Figure 4B:
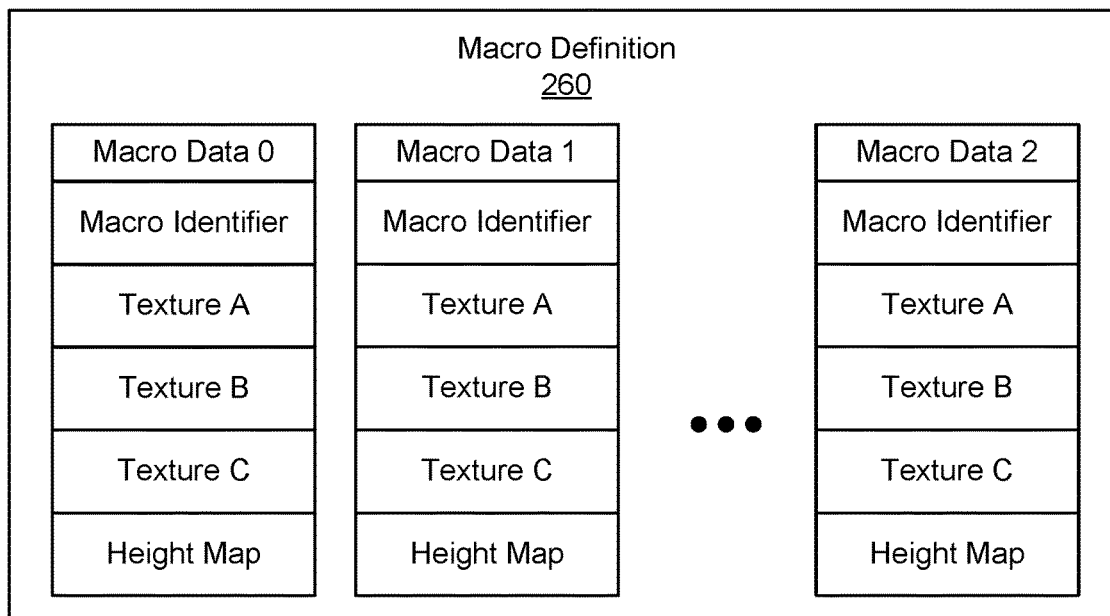
FIG. 4B is a block diagram of macro data used by software modules in memory of the client device of FIG. 1, according to an embodiment.

FIG. 4B is a block diagram of macro data used by software modules in memory of the client device of FIG. 1, according to an embodiment. In particular, FIG. 4B illustrates macro definition data 260, according to one embodiment. The macro definition data 260 includes a macro identifier data for each macro. Each macro is associated with a set of textures, including a height map, as described above. For example, texture A may be a biome texture, texture B may be an alpha layer, and texture C may be a detail layer.

Figure 5:
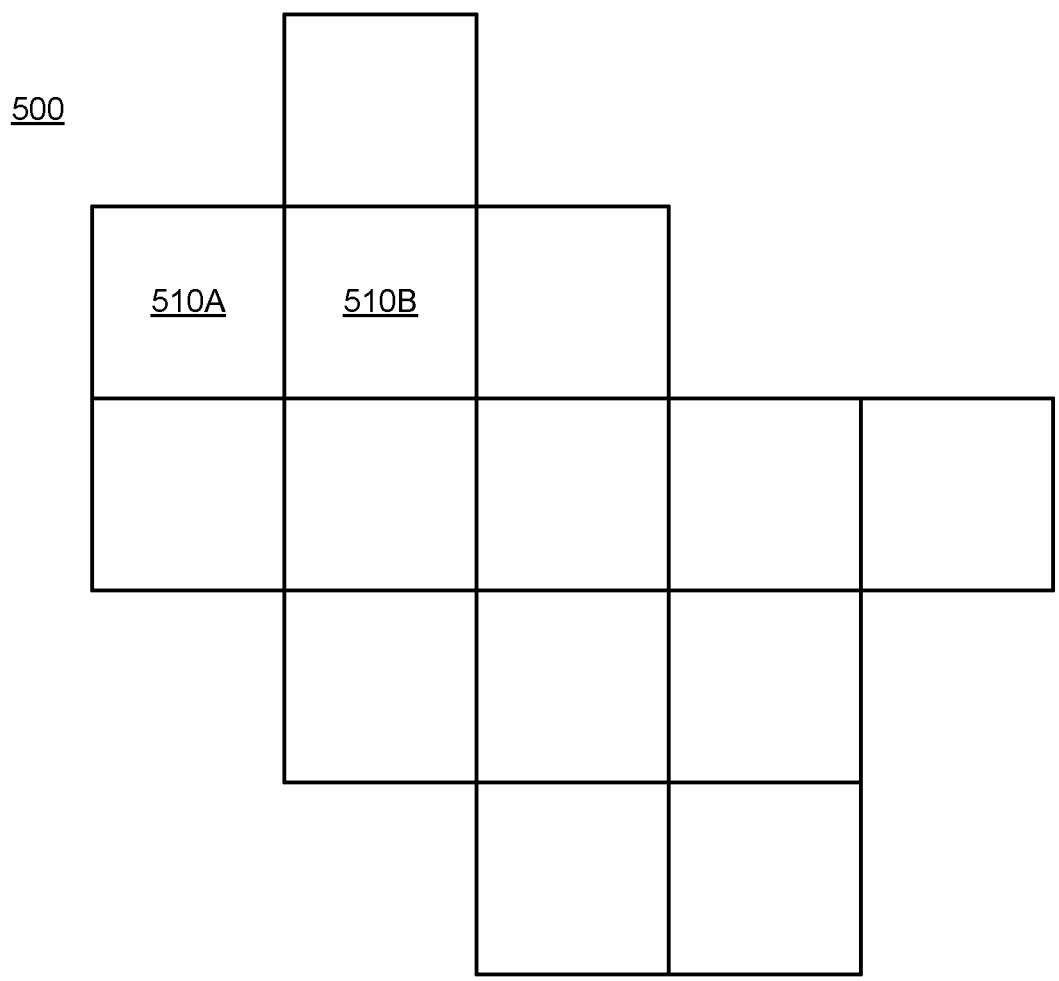
FIG. 5 is an illustration of an electronic map, according to an embodiment.

FIG. 5 is an illustration of an electronic map 500, according to an embodiment. The electronic map 500 includes tiles 510, including tile 510A and tile 510B. The tiles 510 may be arranged differently depending upon the embodiment. For example, the tiles 510 may be arranged in a grid pattern, or to approximate the shape of a geographical location. The particular arrangement of tiles 510 may depend upon a preset configuration or may be set by a user of the content creator 110.

Figure 6:
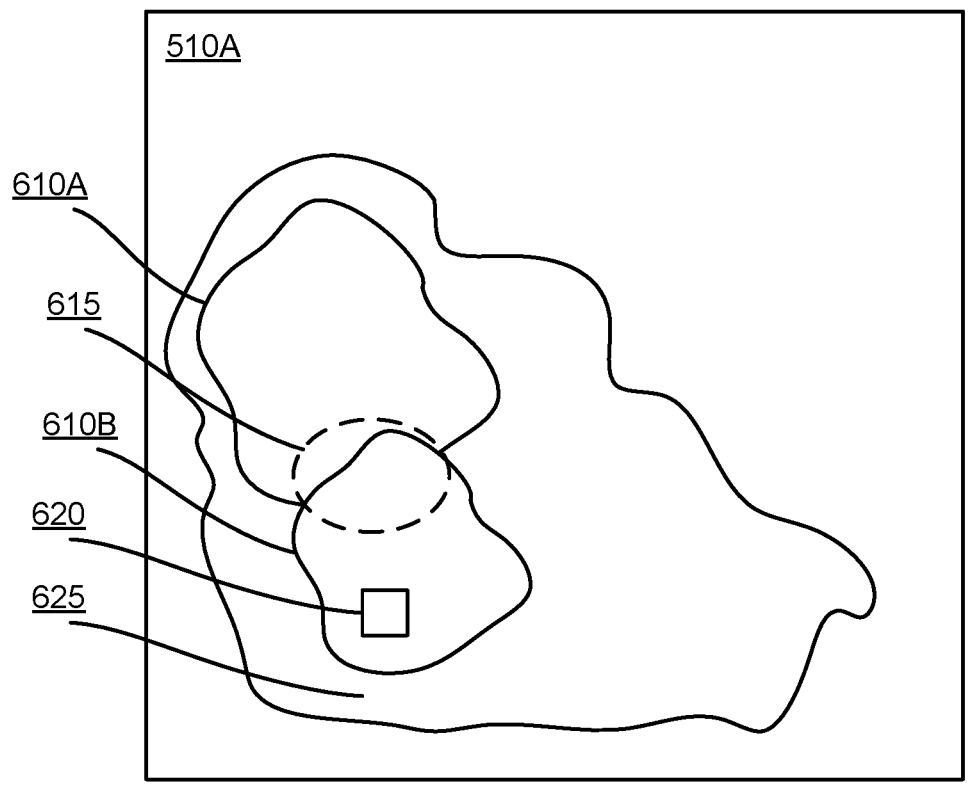
FIG. 6 is an illustration of macros in an electronic map tile of the electronic map of FIG. 5, according to an embodiment.

FIG. 6 is an illustration of macros in electronic map tile 510A of the electronic map of FIG. 5, according to an embodiment. The electronic map tile 510A includes macro instance 610A, macro instance 610B, and macro instance 625. Macro instance 625 is a grassland macro and includes a grass biome. Macros 610A and 610B are two different instances of a mountain macro 610, where macro 610B has been scaled down in size and translated to a different location than macro 610A. The electronic map includes a rule that the mountain macro 610 takes precedence over the grassland macro, and so the instances of the mountain macro extrude over the grassland macro. The electronic map may additionally include a rule that the grassland biome ends wherever another macro is present. The instances of the mountain macro 610 overlap at region 615. The instances of the mountain macro 610 are blended together at the region 615 according to the blending parameters described above. The content creator 110 may edit the macros to add textures, such as an alpha map 620 to macro instance 610B. Depending upon the embodiment, macro instances may or may not overlap tile 510 borders.

Figure 7:
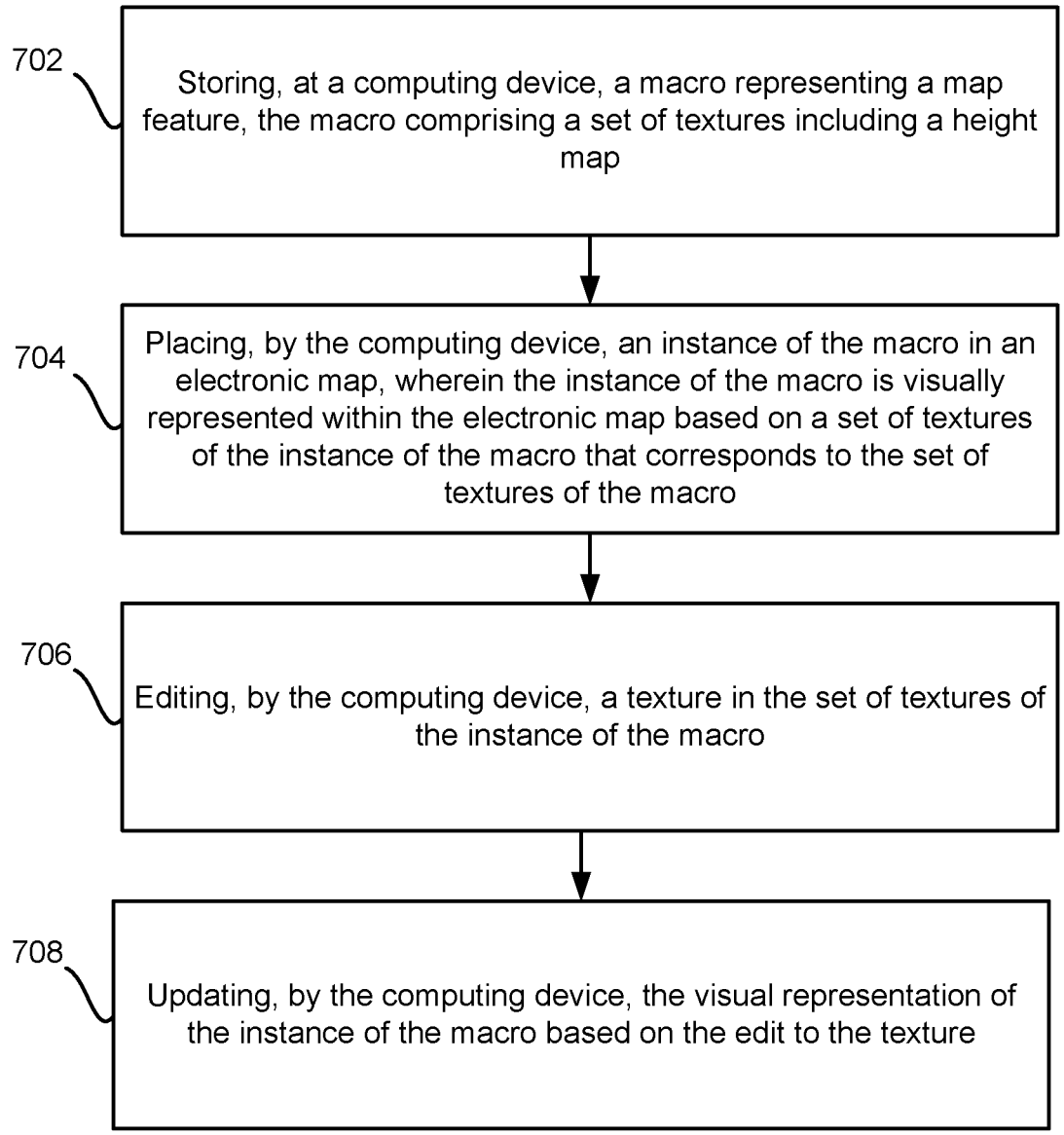
FIG. 7 is a flowchart illustrating a process for implementing the techniques described herein, according to an embodiment.

FIG. 7 is a flowchart illustrating a process for implementing the techniques described herein, according to an embodiment. A computing device, such as the content creator 110, stores 702 a macro representing a map feature, the macro including a set of textures including a height map.

The computing device places 704 an instance of the macro in an electronic map, wherein the instance of the macro is visually represented within the electronic map based on a set of textures of the instance of the macro that corresponds to the set of textures of the macro.

The computing device edits 706 a texture in the set of textures of the instance of the macro.

The computing device updates 708 the visual representation of the instance of the macro based on the edit to the texture.

In one or more embodiments, the computing device transforms the instance of the macro, where the transform includes at least one of rescaling, translating, and rotating the instance of the macro.

In one or more embodiments, the electronic map further comprises a set of rules defining interactions among instances of macros. The computing device determines that the instance of the macro and an instance of a second macro overlap, and blends the instance of the macro and the instance of the second macro based on the set of rules.

In one or more embodiments, blending the instance of the macro and the instance of the second macro is further based on a set of blending parameters.

In one or more embodiments, the computing device compresses the electronic map by collapsing the instance of the macro into a base layer of the electronic map and sends the compressed electronic map to a second computing device.

In one or more embodiments, updating the visual representation of the instance of the macro based on the edit to the texture includes resampling a plurality of textures in the set of textures.

In one or more embodiments, the computing device places another instance of the macro in the electronic map.

Although embodiments described above are explained primarily in reference to a game system, the embodiments may be applied to other applications such as engineering software, navigational software, and educational software, such as a map application or a ride hailing application. Additionally, embodiments can be applied to research applications.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method, comprising:
    storing, at a computing device, a macro representing a map feature, the macro comprising a set of textures that specifies a visual composition of the macro, the set of textures including a height map;
    placing, by the computing device, a first instance of the macro in an electronic map, wherein the first instance of the macro is visually represented within the electronic map based on a first instance of the set of textures corresponding to the first instance of the macro and independently editable to alter the composition of the first instance of the macro;
    placing, by the computing device, a second instance of the macro in the electronic map;

editing, by the computing device, a particular texture in the first instance of the set of textures of the first instance of the macro;

editing, by the computing device, the particular texture in the set of textures of the macro;

updating, by the computing device, the visual representation of the second instance of the macro in the electronic map based on the edit to the particular texture in the set of textures of the macro, wherein the first instance of the macro is visually represented in the electronic map according to the edit to the particular texture in the first instance of the set of textures of the first instance of the macro.

2. The method of claim 1, further comprising:

transforming, by the computing device, the first instance of the macro, wherein the transform comprises at least one of rescaling, translating, and rotating.

3. The method of claim 1, further comprising:

compressing, by the computing device, the electronic map by collapsing the instances of the macro into a base layer of the electronic map; and sending, by the computing device, the compressed electronic map to a second computing device.

4. The method of claim 1, wherein updating the visual representation of the second instance of the macro comprises resampling a plurality of textures in the instance of the set of textures.

5. The method of claim 1, further comprising:

placing, by the computing device, another instance of the macro in the electronic map.

6. The method of claim 1, wherein the electronic map further comprises a set of rules defining interactions among instances of macros, and wherein the method further comprises:

determining, by the computing device, that the first instance of the macro and an instance of a second macro overlap; and blending, by the computing device, the first instance of the macro and the instance of the second macro based on the set of rules.

7. The method of claim 6, wherein blending, by the computing device, the first instance of the macro and the instance of the second macro is further based on a set of blending parameters.

8. A non-transitory computer-readable storage medium storing computer program instructions executable by one or more processors to perform operations, the operations comprising:

storing, at a computing device, a macro representing a map feature, the macro comprising a set of textures that specifies a visual composition of the macro, the set of textures including a height map;

placing, by the computing device, a first instance of the macro in an electronic map, wherein the first instance of the macro is visually represented within the electronic map based on a first instance of the set of textures corresponding to the first instance of the macro and independently editable to alter the composition of the first instance of the macro;

placing, by the computing device, a second instance of the macro in the electronic map;

editing, by the computing device, a particular texture in the first instance of the set of textures of the first instance of the macro;

editing, by the computing device, the particular texture in the set of textures of the macro;

updating, by the computing device, the visual representation of the second instance of the macro in the electronic map based on the edit to the particular texture in the set of textures of the macro, wherein the first instance of the macro is visually represented in the electronic map according to the edit to the particular texture in the first instance of the set of textures of the first instance of the macro.

9. The non-transitory computer-readable storage medium of claim 8, the operations further comprising:

transforming, by the computing device, the first instance of the macro;

wherein the transform comprises at least one of rescaling, translating, and rotating.

10. The non-transitory computer-readable storage medium of claim 8, the operations further comprising:

compressing, by the computing device, the electronic map by collapsing the instances of the macro into a base layer of the electronic map; and sending, by the computing device, the compressed electronic map to a second computing device.

11. The non-transitory computer-readable storage medium of claim 8, wherein updating the visual representation of the second instance of the macro comprises resampling a plurality of textures in the instance of the set of textures.

12. The non-transitory computer-readable storage medium of claim 8, the operations further comprising:

placing, by the computing device, another instance of the macro in the electronic map.

13. The non-transitory computer-readable storage medium of claim 8, wherein the electronic map further comprises a set of rules defining interactions among instances of macros, and wherein the operations further comprise:

determining, by the computing device, that the first instance of the macro and an instance of a second macro overlap; and blending, by the computing device, the first instance of the macro and the instance of the second macro based on the set of rules.

14. The non-transitory computer-readable storage medium of claim 13, wherein blending, by the computing device, the first instance of the macro and the instance of the second macro is further based on a set of blending parameters.

15. A system, comprising:

one or more processors; and a non-transitory computer-readable storage medium storing computer program instructions executable by the one or more processors to perform operations, the operations comprising:

storing, at a computing device, a macro representing a map feature, the macro comprising a set of textures that specifies a visual composition of the macro, the set of textures including a height map;

placing, by the computing device, a first instance of the macro in an electronic map, wherein the first instance of the macro is visually represented within the electronic map based on a first instance of the set of textures corresponding to the first instance of the macro and independently editable to alter the composition of the first instance of the macro;

placing, by the computing device, a second instance of the macro in the electronic map;

editing, by the computing device, a particular texture in the first instance of the set of textures of the first instance of the macro;

editing, by the computing device, the particular texture in the set of textures of the macro;

updating, by the computing device, the visual representation of the second instance of the macro in the electronic map based on the edit to the particular texture in the set of textures of the macro, wherein the first instance of the macro is visually represented in the electronic map according to the edit to the particular texture in the first instance of the set of textures of the first instance of the macro.

16. The system of claim 15, the operations further comprising:

transforming, by the computing device, the first instance of the macro;

wherein the transform comprises at least one of rescaling, translating, and rotating.

17. The system of claim 15, wherein the electronic map further comprises a set of rules defining interactions among instances of macros, and wherein the operations further comprise:

determining, by the computing device, that the first instance of the macro and an instance of a second macro overlap; and blending, by the computing device, the first instance of the macro and the instance of the second macro based on the set of rules.

18. The system of claim 17, wherein blending, by the computing device, the first instance of the macro and the instance of the second macro is further based on a set of blending parameters.

19. The system of claim 15, the operations further comprising:

compressing, by the computing device, the electronic map by collapsing the instances of the macro into a base layer of the electronic map; and sending, by the computing device, the compressed electronic map to a second computing device.

20. The system of claim 15, wherein updating the visual representation of the second instance of the macro comprises resampling a plurality of textures in the instance of the set of textures.

* * * * *